US007068307B2

United States Patent
Hyodo

(10) Patent No.: US 7,068,307 B2
(45) Date of Patent: Jun. 27, 2006

(54) DIGITAL CAMERA FOR CAPTURING AND RECORDING A MOVING IMAGE

(75) Inventor: Manabu Hyodo, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 923 days.

(21) Appl. No.: 10/043,169

(22) Filed: Jan. 14, 2002

(65) Prior Publication Data

US 2002/0093571 A1 Jul. 18, 2002

(30) Foreign Application Priority Data

Jan. 18, 2001 (JP) ............................. 2001-010191

(51) Int. Cl.
*H04N 5/225* (2006.01)

(52) U.S. Cl. ................................ 348/220.1; 348/231.2
(58) Field of Classification Search ............. 348/220.1
See application file for complete search history.

(56) References Cited

U.S. PATENT DOCUMENTS

| 5,903,309 | A  | * | 5/1999 | Anderson ............. 348/333.02 |
| 6,069,994 | A  | * | 5/2000 | Kozuki et al. ............ 386/121 |
| 6,356,709 | B1 | * | 3/2002 | Abe et al. ............... 386/117 |
| 6,754,440 | B1 | * | 6/2004 | Takahashi et al. ......... 386/117 |

* cited by examiner

*Primary Examiner*—Tuan Ho
(74) *Attorney, Agent, or Firm*—Birch, Stewart, Kolasch & Birch, LLP

(57) ABSTRACT

Moving images can be collectively recorded in one file with ease when the moving images are repeatedly captured in the same place or situation. The digital camera which can capture a moving image and record a captured moving image in a file includes a mode setting dial which sets a single recording mode or a continuous recording mode. The captured moving image is recorded in a newly created file when the single recording mode is set by the mode setting dial, and the captured moving image is additionally recorded in an existing file in which a moving image is recorded when the continuous recording mode is set by the mode setting dial. Therefore, when the moving images are repeatedly captured, the moving images can be collectively recorded in one file with ease, and can be also jointed in captured order.

13 Claims, 8 Drawing Sheets

FIG.8

| QUALITY | ▶ | NORMAL / [FINE] |
| PIXEL | ▶ | [640x480] / 320x240 |
| FRAME RATE | ▶ | 60 / [30] / 15 |
| JOINT IMAGE | ▶ | [NEW] 2 3 7 9 |

DIGITAL CAMERA FOR CAPTURING AND RECORDING A MOVING IMAGE

BACKGROUND OF THE INVENTION

1. Field of the Invention

The present invention relates to a digital camera, and more particularly to a digital camera which can capture a moving image and records a captured moving image in a file.

2. Description of the Related Art

A digital camera has been known which can capture a moving image as well as a still image, such as dsc-SX550 manufactured by SANYO Electric Co., Ltd. This camera has a function of jointing a plurality of captured moving image data.

On the other hand, a video camera which records moving images on a magnetic tape can continuously record the moving images on one magnetic tape in captured order as long as the magnetic tape is unchanged.

However, the video camera has problems of difficulty in search since various kinds of moving image data including different capturing dates, places, situations or the like are continuously recorded on one magnetic tape in captured order, and complicated capturing with magnetic tapes changed for each kind of data.

Each moving image data captured by the digital camera which can capture the moving image is recorded in a new file for each capturing, and has a thumbnail or the like for index display. Therefore, the moving image can be selected from the index displayed thumbnails and played back, but it is difficult to search a desired file from the thumbnails since a new file is created for each capturing of the moving image to thereby provide enormous number of files.

A digital camera having the function of jointing the plurality of moving images can joint and collect the plurality of files, but has a problem of complicated operation in jointing a large number of files. Generally, the moving data are desirably jointed in time order, but there is a possibility that the data are not jointed in time order because of operation errors or the like.

SUMMARY OF THE INVENTION

The present invention has been achieved in view of the above-described circumstances, and has as its object the provision of a digital camera which can collectively record moving images in one file with ease and smoothly joint the moving images, when the moving images are repeatedly captured in the same place or situation.

In order to attain the above-described object, the present invention is directed to a digital camera which is capable of capturing a moving image and recording a captured moving image in a file, the digital camera comprising: a recording mode setting device which sets one of a single recording mode and a continuous recording mode; and a recording device which records, when the single recording mode is set by the recording mode setting device, the captured moving image in a newly created file, and records, when the continuous recording mode is set by the recording mode setting device, the captured moving image additionally in an existing file in which a moving image is recorded.

That is, when the continuous recording mode is set, the moving images captured thereafter are additionally recorded in the existing file. Therefore, when the moving images are repeatedly captured, the moving images can be collectively recorded in one file with ease, and can be also jointed in captured order.

Preferably, the digital camera further comprises: a file selecting device which selects the existing file, wherein when the existing file is selected by the file selecting device, the recording device records the captured moving image additionally in the selected existing file, and when the existing file is not selected by the file selecting device, the recording device records the captured moving image additionally in an existing file in which a latest moving image is recorded. This permits selection of an arbitrary file in which the moving image is additionally recorded. When the file in which the moving image is additionally recorded is not selected, the file with the latest moving image recorded is automatically selected.

Preferably, the digital camera further comprises: an index display instructing device which selects a plurality of files from a recording medium which stores files including the file in which the moving image is recorded in the single recording mode and the file in which the moving image is recorded in the continuous recording mode, and provides an instruction to display an index image constituted by a plurality of frames corresponding to the plurality of files; and a display controlling device which, when the index display instructing device provides the instruction to display the index image, forms the index image based on the plurality of files stored in the recording medium and displays the index image on an image monitor, and which displays a frame corresponding to the moving image recorded in the single recording mode and a frame corresponding to the moving image recorded in the continuous recording mode among the plurality of frames forming the index image with display forms thereof being different from each other. Specifically, when the index image is displayed, the moving image recorded in the single recording mode and the moving image recorded in the continuous recording mode can be differentially displayed.

Preferably, the digital camera further comprises: a selecting device which selects an arbitrary file from the recording medium which stores the files including the file in which the moving image is recorded in the single recording mode and the file in which the moving image is recorded in the continuous recording mode; and a display controlling device which displays one frame of the moving image on the image monitor in such a manner that a display form thereof is different between when the moving image is recorded in the file selected by the selecting device in the single recording mode and when the moving image is recorded in the file selected by the selecting device in the continuous recording mode. Specifically, even when one frame display of the moving image is carried out, the moving image recorded in the single recording mode and the moving image recorded in the continuous recording mode can be differentially displayed.

Preferably, when the recording medium includes a file in which a still image is recorded, the display controlling device displays the frames corresponding to the moving images recorded in the single recording mode and the continuous recording mode with display forms thereof different from a display form of the still image.

Preferably, the digital camera further comprises: a setting device which sets recording criteria in capturing the moving image, wherein when the continuous recording mode is set by the recording mode setting device, the recording criteria in capturing the moving image which is recorded in the existing file in which the moving image is additionally recorded are automatically set to disable setting by the setting device. Preferably, the recording criteria include at least one of image quality, the number of pixels and a frame rate. This causes unification of the image quality of the moving images to be jointed, thereby permitting smooth joint of the moving images.

Preferably, the digital camera further comprises: a device which obtains a white balance correction value based on information from a subject; a device which carries out white balance correction with the white balance correction value changed so as to gradually converge from a current white valance correction value to the obtained white balance correction value in capturing the moving image; and a storing device which stores a white balance correction value used at finish of capturing the moving image, wherein when the continuous recording mode is set by the recording mode setting device, the white balance correction value stored in the storing device is used as a white balance correction value at start of capturing the moving image.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 8 is a view of another example of a setup screen in the continuous recording mode.

DETAILED DESCRIPTION OF THE PREFERRED EMBODIMENTS

Hereunder a preferred embodiment will be described in detail for a digital camera according to the present invention in accordance with the accompanied drawings.

Figure 1:
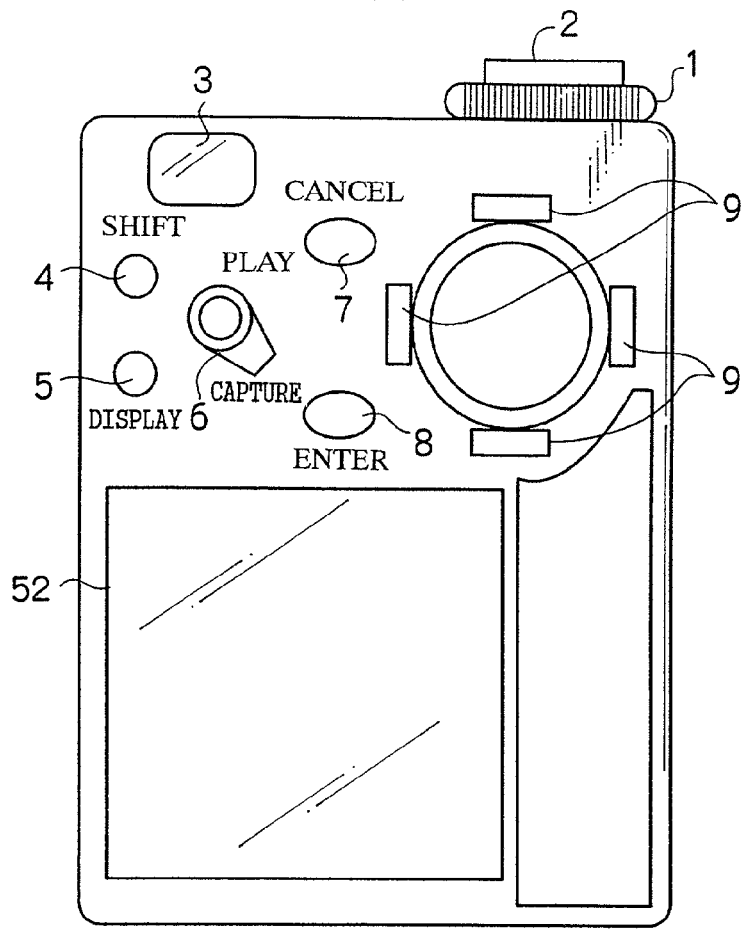
FIG. 1 is a rear elevational view of a digital camera according to the present invention.
Figure 2:
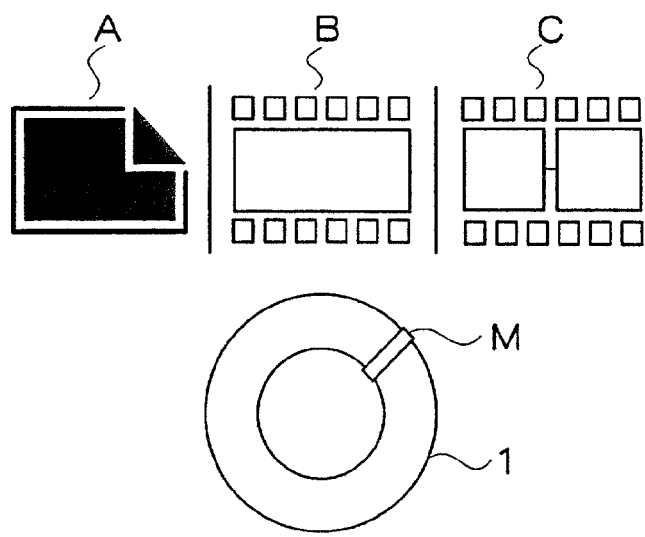
FIG. 2 is a plan view of a mode setting dial provided on a top of the digital camera shown in FIG. 1.

FIG. 1 is a rear elevational view of the digital camera according to the invention, and FIG. 2 is a plan view of a mode setting dial provided on a top of the camera.

As shown in FIG. 2, a mode setting dial 1 sets a still image capturing mode for capturing a still image, a single recording mode for capturing a moving image, a continuous recording mode for capturing the moving image, or the like in a capturing mode, and a mark M on the dial is rotated to an icon A, B or C showing each mode in accordance with a mode to be set. The single recording mode is a mode for recording a captured moving image in a newly created file, and the continuous recording mode, which is a novel characteristic of the invention, is a mode for additionally recording the captured moving image in an existing file in which a moving image is recorded.

FIG. 2 shows the continuous recording mode being set by the mode setting dial 1. The mode setting dial 1 is provided, in a center thereof, with a shutter button 2 having a switch S1 turned on by half press and a switch S2 turned on by full press.

The digital camera is provided, in a rear surface thereof, with a viewfinder 3, shift key 4, display key 5, capturing mode/playback mode switch lever 6, cancel key 7, enter key 8, multifunction cross key 9 and liquid crystal monitor 52 as shown in FIG. 1.

Figure 3:
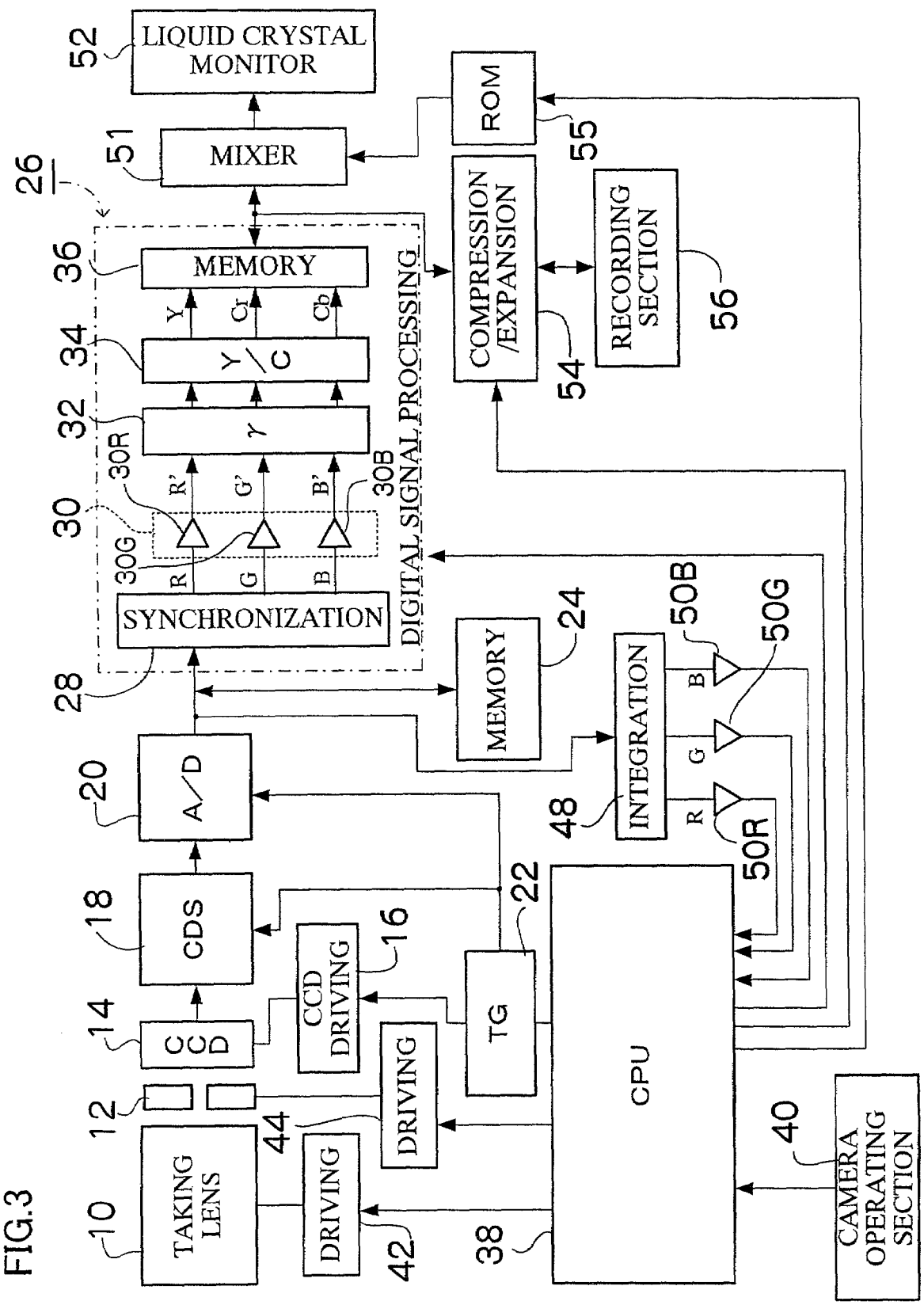
FIG. 3 is a block diagram showing an inner configuration of the digital camera shown in FIG. 1.

FIG. 3 is a block diagram showing an inner configuration of the digital camera shown in FIG. 1.

In the drawing, a subject image focused on a light receiving surface of a charge coupled device 14 (CCD) via a taking lens 10 and an iris 12 is converted to signal charges of the amount corresponding to an amount of incident light in each sensor. The signal charges thus accumulated are read on a shift register by a lead gate pulse added from a CCD driving circuit 16, and successively read as voltage signals in accordance with the signal charges by a register transfer pulse. The CCD 14 has an electronic shutter function of sweeping the accumulated signal charges by a shutter gate pulse and thereby controlling accumulation time (shutter speed) of the charges.

The voltage signals successively read from the CCD 14 are added to a correlated double sampling circuit (CDS circuit) 18, where R, G, B signals for respective pixels are subjected to sampling hold and added to an A/D converter 20. The A/D converter 20 converts the R, G, B signals successively added from the CDS circuit 18 to digital R, G, B signals to be output. The CCD driving circuit 16, CDS circuit 18 and A/D converter 20 are synchronously driven by a timing signal added from a timing generating circuit 22.

The R, G, B signals output from the A/D converter 20 are once stored in a memory 24, and the R, G, B signals stored in the memory 24 are then added to a digital signal processing circuit 26. The digital signal processing circuit 26 comprises a synchronizing circuit 28, a white balance adjusting circuit 30, a gamma correcting circuit 32, a YC signal generating circuit 34, a memory 36, or the like.

The synchronizing circuit 28 converts the successive R, G, B signals read from the memory 24 to synchronized signals and synchronously outputs the R, G, B signals to a white balance adjusting circuit 30. The white balance adjusting circuit 30 comprises multipliers 30R, 30G, 30B for respectively increasing and decreasing digital values of the R, G, B signals, and the R, G, B signals are added to the multipliers 30R, 30G, 30B, respectively. A white balance correction value (gain value) for white balance control from a central processing unit (CPU) 38 is added to the multipliers 30R, 30G, 30B as another input, and the multipliers 30R, 30G, 30B multiply two inputs, and output R', G', B' signals white balance adjusted by the multiplication to a gamma correcting circuit 32. Details of the white balance correction value added from the CPU 38 to the white balance adjusting circuit 30 will be described later.

The gamma correcting circuit 32 changes input and output properties in such a manner that the R', G', B' signals white balance adjusted have desired gamma characteristics, and output the R', G', B' signals to the YC signal generating circuit 34. The YC signal generating circuit 34 generates a brightness signal Y and chroma signals Cr, Cb from gamma corrected R, G, B signals. The brightness signal Y and the chroma signals Cr, Cb (YC signals) are stored in the memory 36 having the same memory space as the memory 24.

The YC signals stored in the memory 36 in capturing are added to a compression/expansion circuit 54. Information on image quality (a compression rate such as normal or fine) previously set from the CPU 38 is added to the compression/ expansion circuit 54 as another input, and the compression/expansion circuit 54 compresses the YC signals at the set compression rate of image quality. By JPEG algorithm, the YC signals are divided into 8×8 pixels blocks, data of each block is discrete cosine transformed and divided with a quantized table prepared for each compression rate. Further, the quantized data is encoded with a Huffman table. The data thus encoded is recorded in a recording medium, for example, a memory card such as SmartMedia or Compact Flash, or a magneto-optical disk such as CDR or DVDR in a recording section 56.

The CPU 38 controls each circuit based on inputs from a camera operating section 40 including the mode setting dial 1, shutter button 2, or the like shown in FIG. 1, and also controls autofocus, automatic exposure, automatic white balance, or the like. The autofocus control is of contrast AF type which moves the taking lens 10 so as to maximize a high frequency component of the G signal, for example, and moves the taking lens 10 to a focusing position via a driving section 42 so as to maximize the high frequency component of the G signal when the shutter button 2 is half pressed.

In the automatic exposure control, the R, G, B signals are captured, subject brightness (a taking EV value) is obtained based on an integrated value of the R, G, B signals, and an aperture in capturing and shutter speed are determined based on the taking EV value. In the still image capturing mode, the iris 12 is driven via a driving section 44 so as to have the determined aperture when the shutter button 2 is full pressed, and accumulation time of the charges are controlled by an electronic shutter so as to achieve the determined shutter speed for capturing image data for one frame, which is then recorded in the recording medium after required signal processing.

Next, a case of setting the single recording mode or continuous recording mode by the mode setting dial 1 to capture the moving image will be described.

In this case, one press of the shutter button 2 starts capturing the moving image, image data is, for example, captured in the memory 24 at a frame rate of 30 frames per second, and another press of the shutter button 2 finishes capturing the moving image. Without another press of the shutter button 2, the capturing of the moving image is automatically finished when the memory 24 is full.

When the capturing of the moving image is finished, the image data temporarily stored in the memory 24 is then signal processed or compression processed, and recorded in the recording medium in a predetermined file format.

Figure 4:
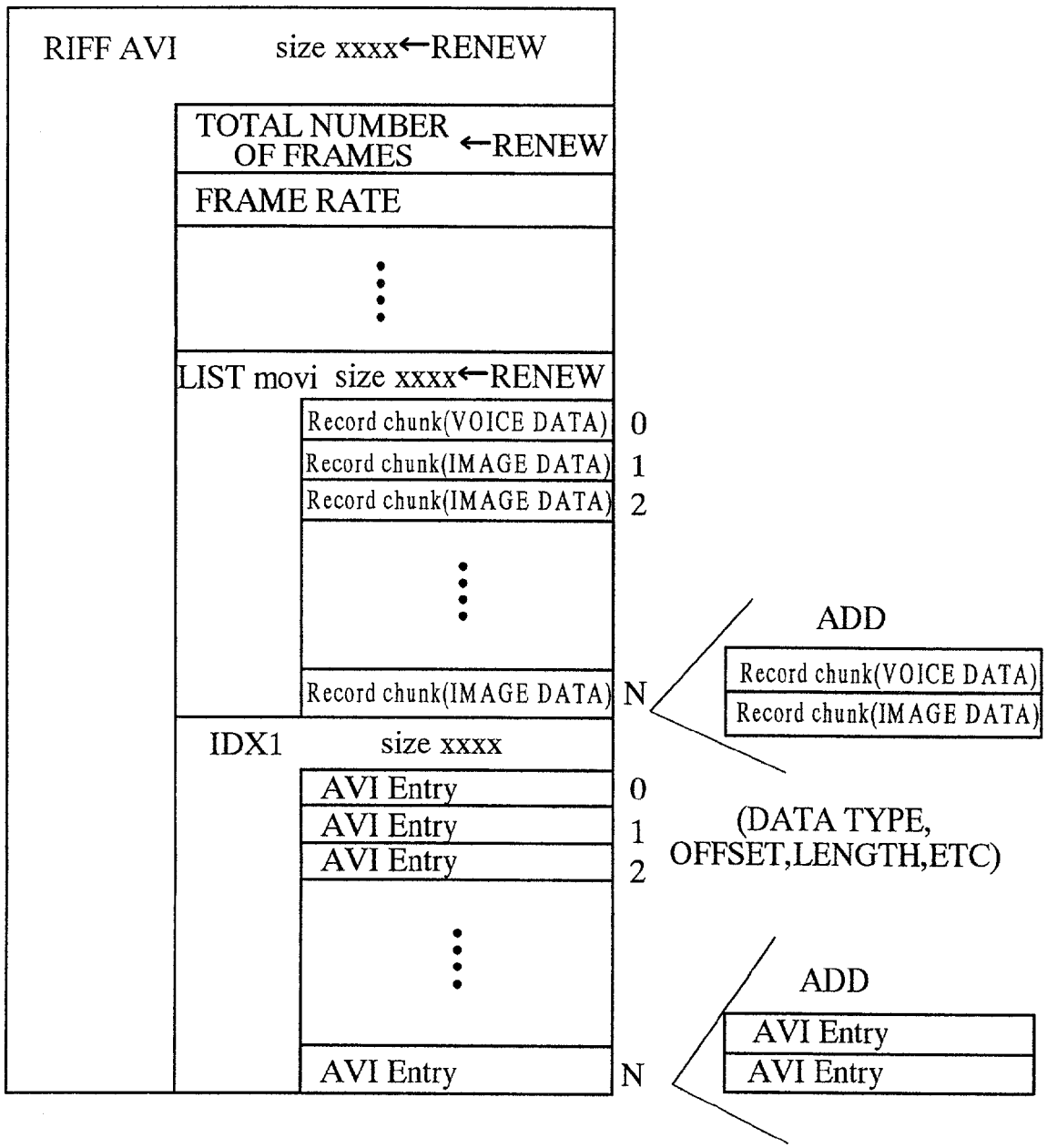
FIG. 4 is a view of an AVI file structure and a manner of adding new data.

FIG. 4 shows a Motion JPEG (AVI) file structure in which the moving image is recorded.

In the drawing, a size of the entire file (the number of bites), the number of frames, a frame rate, or the like are recorded in RIFF AVI. In each Record chunk 0, 1, 2 . . . of LIST movi, voice data or image (jpeg) data is recorded. When the frame rate is 30 frames per second, the voice data lasts for a second, and the image data for 30 frames are continuously recorded after the voice data to form moving image data for a second. In this way, the voice data and the image data are repeatedly recorded for seconds of capturing time. A total size of the data recorded in all the Record chunks is recorded in the LIST movi.

In AVI Entry of IDX1, data types for differentiation between the image data/voice data, an amount of offset to the data, a length of data, or the like in each Record chunk are recorded. A total size of the data recorded in all the AVI Entry is recorded in the IDX1.

When the continuous recording mode according to the invention is set by the mode setting dial 1, and then the moving image is captured by operating the shutter button 2, the image data and voice data of the moving image obtained by the capturing are additionally recorded in an existing AVI file in which a moving image is recorded.

That is, when the image data and voice data of the moving image are additionally recorded in the existing AVI file, the size of the entire file and the number of frames in the RIFF AVI are renewed as shown in FIG. 4. New voice/image Record chunks are added after the last Record chunk of the LIST movi, and the size of the file is renewed, and further, new AVI Entry is added after the last AVI Entry of IDX1, and the file size is renewed.

When the continuous recording mode is set as described above, the moving images captured thereafter are additionally recorded in the existing file. Thus, these moving images are collectively recorded in one file when repeatedly captured in the continuous recording mode.

Next, the white balance control in the case where the continuous recording mode is set will be described.

Figure 5:
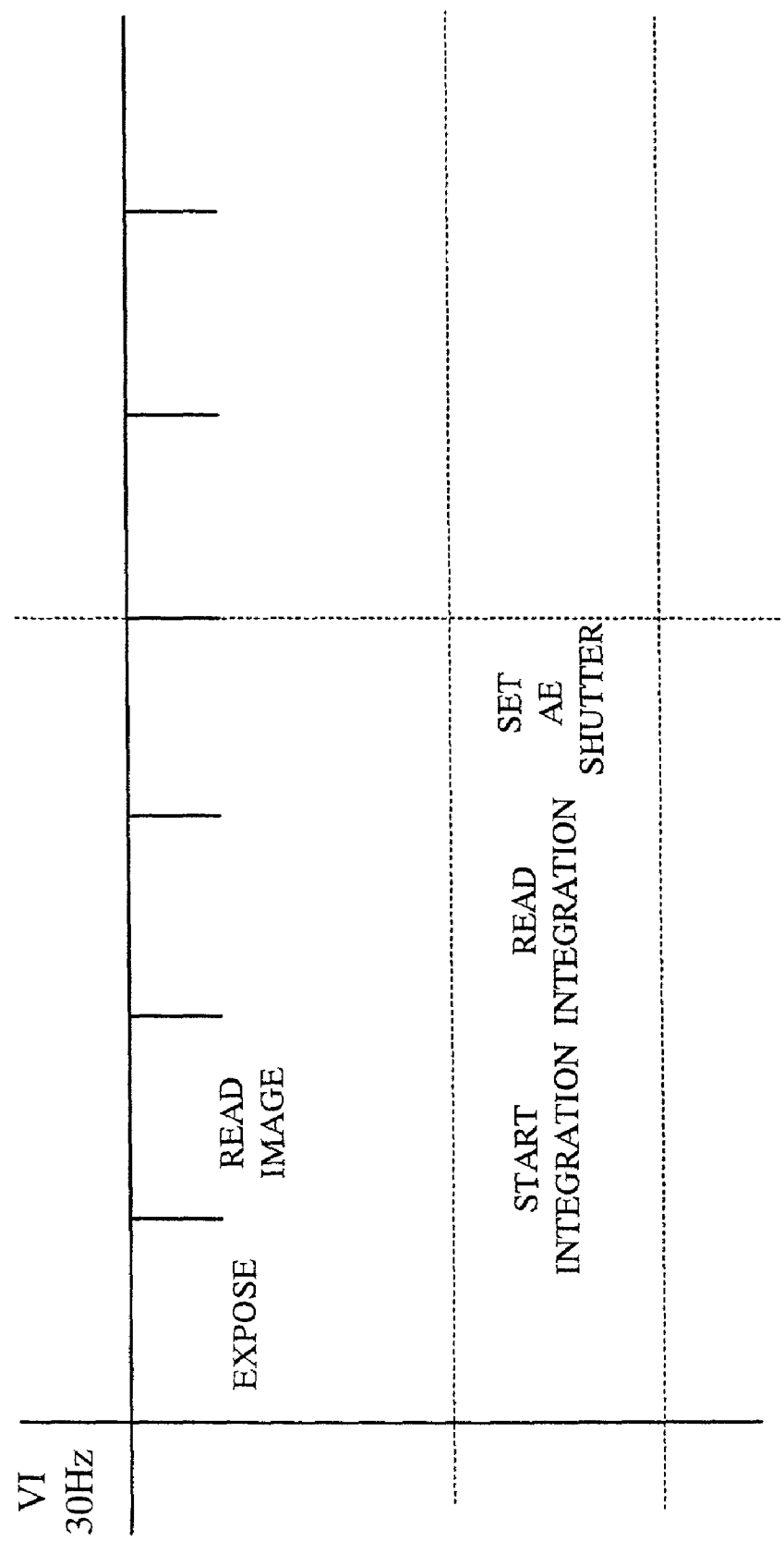
FIG. 5 is a view used for explaining operation of AE.

As shown in FIG. 5, processing mentioned below is carried out for each clock of 1V period in movie operation. Exposure is carried out in a first 1V period, image reading is started in a next clock, the images are stored in the memory 24 as the R, G, B signals, and an average integrated value for each color of the R, G, B signals is obtained in each divided area of one screen which is divided into a plurality of areas (8×8). The integrated value is read in the next clock, the subject brightness (capturing EV value) is obtained based on the integrated value of the R, G, B signals, and the shutter such as the aperture (AE) in capturing is set based on the capturing EV value in a further next clock.

As described above, AE operation is completed in four clocks as a set. During this operation, the exposure and image reading are carried out in any of the clocks.

First exposure is carried out at a predetermined exposure value. The average integrated value of the R, G, B signals for each divided area is calculated by an integrating circuit 48 in FIG. 3 and added to the CPU 38. Multipliers 50R, 50G, 50B are provided between the integrating circuit 48 and CPU 38, and an adjustment gain value for adjusting variation of devices is added to the multipliers 50R, 50G, 50B.

The white balance control is not carried out as often as the AE since gradual variation is desired. For example, the white balance correction is carried out approximately once per second.

The auto white balance control is carried out in feedforward. First, a light source type such as daylight (sunny), shade-cloudy, a fluorescent lamp, or a tungsten lamp is discriminated. In this discrimination of the light source type, ratios R/G, R/B of the average integrated values for each color of the R, G, B signals are obtained in each divided area, and a detection frame which shows a range of color distribution corresponding to each light source type is set on a graph having R/G on the lateral axis and B/G on the vertical axis. Then, the number of areas within the detection frame is obtained based on the ratios R/G, B/G for each obtained area, and the light source type is discriminated based on the subject brightness level and the number of areas within the detection frame (see Japanese Patent Application Publication No. 2000-224608).

When the light source type is thus discriminated, an amount of correction is calculated in such a manner that a predetermined white balance correction value suitable for the discriminated light source type becomes a target value of correction to carry out correction. A manner of obtaining the white balance correction value is not limited to this.

Figure 6:
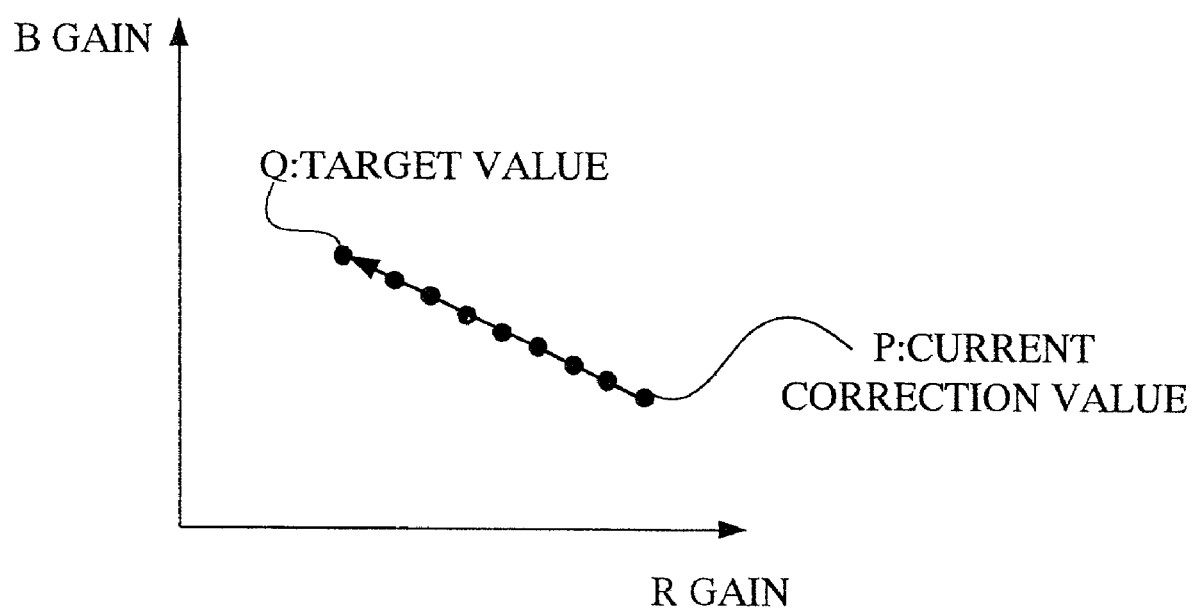
FIG. 6 is a view used for explaining correction operation of white balance.

R and B gain values for the white balance correction are corrected, as shown in FIG. 6, in such a manner that the current correction value and the target value are determined as P and Q, respectively, and that the current correction value P does not reach the target value Q by one time correction but gradually converges to the target value Q by several times of correction.

Now, the last white balance correction value is stored in the moving image file or the memory in the camera at finish of capturing, the stored white balance correction value is read in next capturing in the continuous recording mode, and used as the white balance correction value at start of capturing.

This permits agreement between the white balance correction values of the moving images to be jointed and smooth joint of the moving images. Further, conversion to the target value can be achieved at higher speed compared to a predetermined criteria (for example, a white balance correction value of available light) used at start of capturing in the single recording mode.

Next, a setting method of recording criteria in capturing the moving images and a selecting method of the existing moving image file used in the continuous recording mode will be described.

Figure 7:
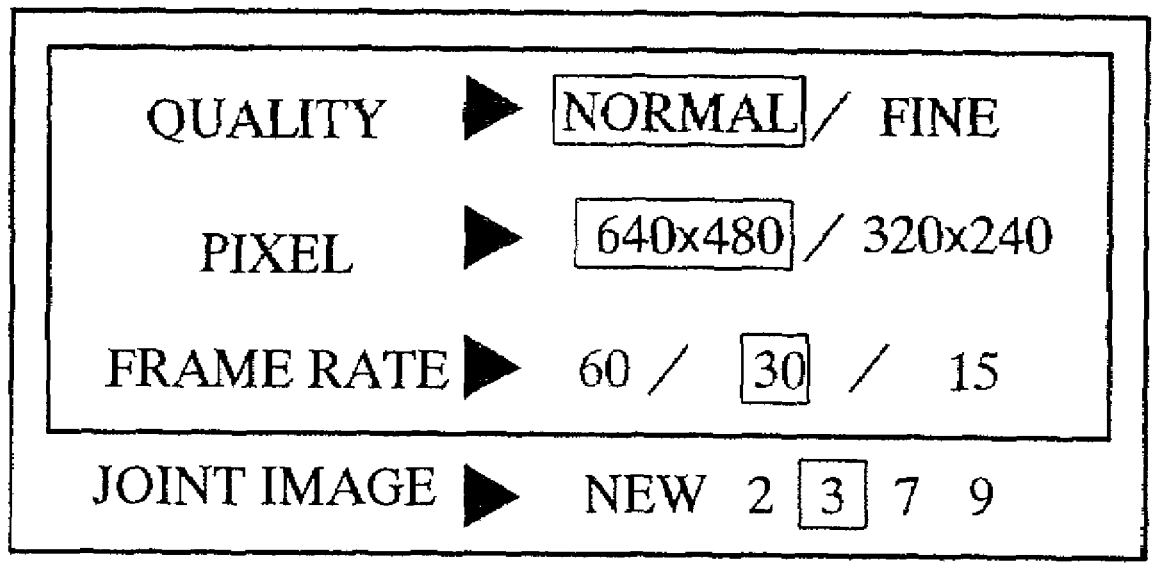
FIG. 7 is a view of an example of a setup screen in a continuous recording mode.

When the continuous recording mode is now set by the mode setting dial 1 and a setup button (not shown) is operated to read, from ROM (read only memory) 55 shown in FIG. 3, recording criteria such as image quality, the number of pixels or a frame rate, or a setup screen for selecting joint images, and to display the setup screen as shown in FIG. 7 or 8 on a liquid crystal monitor 52 via a mixer 51.

In FIG. 7 or 8, numbers displayed next "NEW" show file numbers, and especially, numbers "2", "3", "7", "9" show file numbers of the moving images. The moving image of file number "3" is selected in FIG. 7, and a "NEW" file is selected in FIG. 8.

When the existing moving image is selected as shown in FIG. 7 as a joint file, the recording criteria (a compression rate, the number of pixels, the frame rate) of the file are displayed to disable reset of the recording criteria. In this case, the recording criteria are displayed, for example, with crosshatched, so as to clarify that the reset of the recording criteria are disabled.

On the other hand, when "NEW" is selected as shown in FIG. 8, the compression rate, the number of pixels, and the frame rate can be freely selected by moving a cursor using a multifunction cross key 9.

The file number of the moving image recorded in the single recording mode and the file number of the moving image recorded in the continuous recording mode may be discriminated by color coding. When the existing file is not selected in the continuous recording mode, the latest moving image file is automatically selected.

Next, a case where the still image and the moving image recorded in the recording medium are played back will be described.

Image playback in a playback mode includes one frame playback, index playback for playing back index images constituted by a plurality of frames (nine frames in this embodiment), and moving image playback carried out when playback of the moving image is instructed with one frame of the moving image displayed during one frame playback or index playback.

Selecting the playback mode by the capturing mode/playback mode switch lever 6 automatically causes one frame playback, and one frame of the last file is selected and played back on the liquid crystal monitor 52. Further, operating the multifunction cross key 9 permits successive frame feeding.

Figure 9:
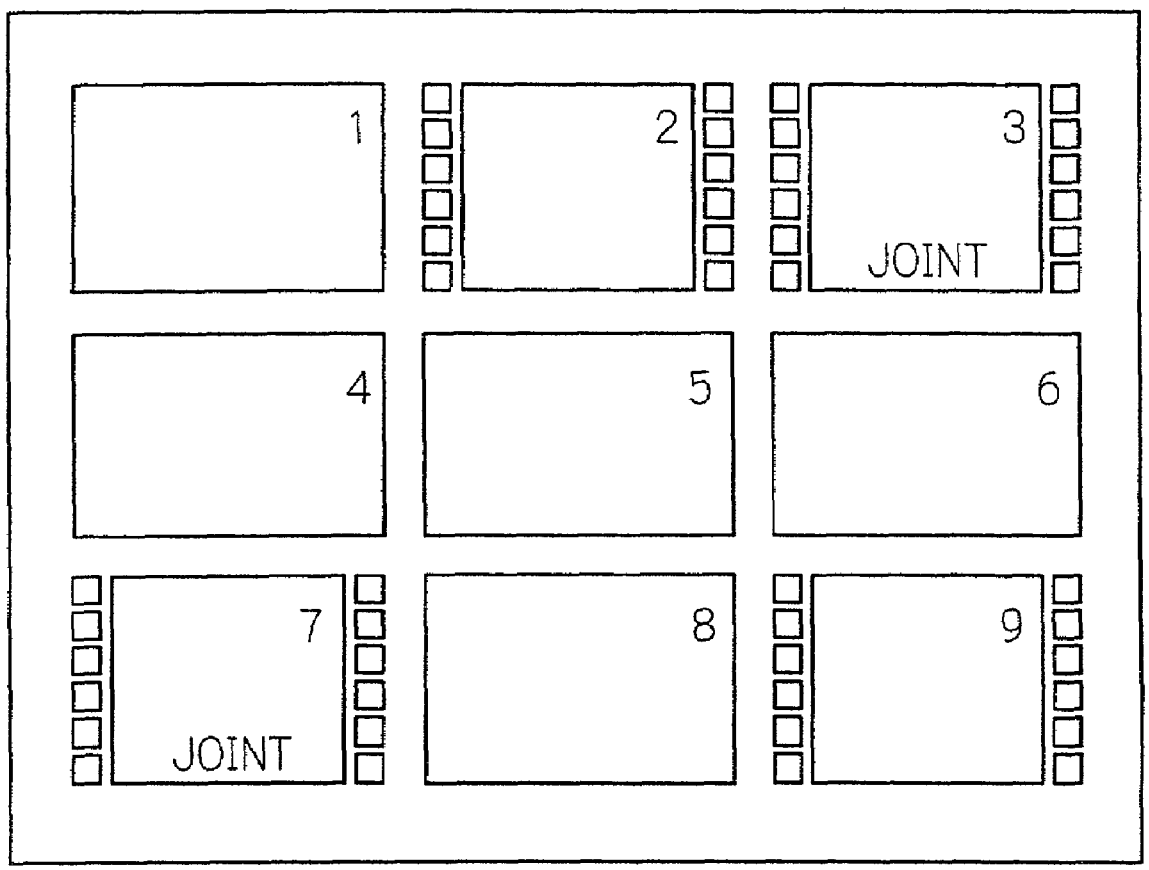
FIG. 9 is a view of an example of an index screen.

On the other hand, when the index playback is instructed by operating the display key 5, the index image constituted by nine frames is displayed as shown in FIG. 9. On the index image, a frame to be played back can be selected by an up/down key and a right/left key of the cross key 9. The selected frame is fringed and differentiated from other frames. When the up/down key and right/left key of the cross key 9 are operated beyond the index image, an index screen is switched.

When the file with the still image recorded, the file with the moving image recorded in the single recording mode, and the file with the moving image recorded in the continuous recording mode are mixedly included, the still image and one frame of the moving image are mixedly displayed during frame feeding in the one frame playback, and similarly, the still image and one frame of the moving image are mixedly displayed in the index image in the index playback.

Thus, the still image and one frame of the moving image are displayed with display forms thereof different from each other so as to be differentiated at a glance in the one frame playback or the index playback.

FIG. 9 shows an index image where the still image and the moving images of the single recording mode and continuous recording mode are displayed with display forms thereof different from one another.

In the embodiment shown in FIG. 9, the image showing one frame of the moving image (image denoted by file number 2, 3, 7 or 9) in the index image is displayed as an image with perforations at right and left ends of one frame which suggests a movie film, and characters "JOINT" showing a joint image are superimposed on one frame of the moving image recorded in the continuous recording mode.

This permits identification of the still image, the moving image in the single recording mode, and the moving image in the continuous recording mode on the index screen.

The setup screen shown in FIG. 7 or 8 and the index screen may be overlaid, thereby clarifying correspondence between the moving images to be jointed and the numbers of files in which the moving images are recorded.

The digital camera according to the invention also includes a moving image camera (disk movie, DVD movie) which records images in an optical disk or the like.

As described above, according to the invention, capturing with the continuous recording mode set when repeatedly capturing the moving images in the same place or situation allows the moving images to be collectively recorded in one file. Also, the file in which the moving image is additionally recorded can be arbitrarily selected, thereby producing effects of permitting classification of the moving image files for each kind and facilitating search.

Further, the recording criteria of the moving images to be jointed are adapted to agree with each other, and a white balance correction value of immediately preceding moving image is used as an initial value of a white balance correction value of immediately following moving image, thereby permitting smooth joint of the moving images.

Further, in one frame display of the moving image, the moving image recorded in the single recording mode and the moving image recorded in the continuous recording mode can be differentially displayed, thereby facilitating selection of the desired moving image.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital camera which is capable of capturing a moving image and recording a captured moving image in a file, the digital camera comprising:
    a recording mode setting device which sets one of a single recording mode and a continuous recording mode; and
    a recording device for recording the captured moving image in a newly created file when the single recording mode is set by the recording mode setting device, and for recording the captured moving image additionally in an existing file in which a moving image is recorded when the continuous recording mode is set by the recording mode setting device.

2. The digital camera according to claim 1, further comprising:
    an index display instructing device which selects a plurality of files from a recording medium which stores files including the file in which the moving image is recorded in the single recording mode and the file in which the moving image is recorded in the continuous recording mode, and provides an instruction to display an index image constituted by a plurality of frames corresponding to the plurality of files; and
    a display controlling device which, when the index display instructing device provides the instruction to display the index image, forms the index image based on the plurality of files stored in the recording medium and displays the index image on an image monitor, and which displays a frame corresponding to the moving image recorded in the single recording mode and a frame corresponding to the moving image recorded in the continuous recording mode among the plurality of frames forming the index image with display forms thereof being different from each other.

3. The digital camera according to claim 2, wherein when the recording medium includes a file in which a still image is recorded, the display controlling device displays the frames corresponding to the moving images recorded in the single recording mode and the continuous recording mode with display forms thereof being different from a display form of the still image.

4. The digital camera according to claim 1, further comprising:
    a selecting device which selects an arbitrary file from a recording medium which stores the files including the file in which the moving image is recorded in the single recording mode and the file in which the moving image is recorded in the continuous recording mode; and
    a display controlling device which displays one frame of the moving image on an image monitor in such a manner that a display form thereof is different between when the moving image is recorded in the file selected by the selecting device in the single recording mode and when the moving image is recorded in the file selected by the selecting device in the continuous recording mode.

5. The digital camera according to claim 4, wherein when the recording medium includes a file in which a still image is recorded, the display controlling device displays the frames corresponding to the moving images recorded in the single recording mode and the continuous recording mode with display forms thereof being different from a display form of the still image.

6. The digital camera according to claim 1, further comprising:
    a file selecting device which selects the existing file,
    wherein when the existing file is selected by the file selecting device, the recording device records the captured moving image additionally in the selected existing file, and when the existing file is not selected by the file selecting device, the recording device records the captured moving image additionally in an existing file in which a latest moving image is recorded.

7. The digital camera according to claim 6, further comprising:
    an index display instructing device which selects a plurality of files from a recording medium which stores files including the file in which the moving image is recorded in the single recording mode and the file in which the moving image is recorded in the continuous recording mode, and provides an instruction to display an index image constituted by a plurality of frames corresponding to the plurality of files; and
    a display controlling device which, when the index display instructing device provides the instruction to display the index image, forms the index image based on the plurality of files stored in the recording medium and displays the index image on an image monitor, and which displays a frame corresponding to the moving image recorded in the single recording mode and a frame corresponding to the moving image recorded in the continuous recording mode among the plurality of frames forming the index image with display forms thereof being different from each other.

8. The digital camera according to claim 7, wherein when the recording medium includes a file in which a still image is recorded, the display controlling device displays the frames corresponding to the moving images recorded in the single recording mode and the continuous recording mode with display forms thereof being different from a display form of the still image.

9. The digital camera according to claim 6, further comprising:
    a selecting device which selects an arbitrary file from a recording medium which stores the files including the file in which the moving image is recorded in the single recording mode and the file in which the moving image is recorded in the continuous recording mode; and
    a display controlling device which displays one frame of the moving image on an image monitor in such a manner that a display form thereof is different between when the moving image is recorded in the file selected by the selecting device in the single recording mode and when the moving image is recorded in the file selected by the selecting device in the continuous recording mode.

10. The digital camera according to claim 9, wherein when the recording medium includes a file in which a still image is recorded, the display controlling device displays the frames corresponding to the moving images recorded in the single recording mode and the continuous recording mode with display forms thereof being different from a display form of the still image.

11. The digital camera according to claim 1, further comprising:
    a setting device which sets recording criteria in capturing the moving image,
    wherein when the continuous recording mode is set by the recording mode setting device, the recording criteria in capturing the moving image which is recorded in the existing file in which the moving image is additionally recorded are automatically set to disable setting by the setting device.

12. The digital camera according to claim 11, wherein the recording criteria include at least one of image quality, the number of pixels and a frame rate.

13. The digital camera according to claim 1, further comprising:
- a device which obtains a white balance correction value based on information from a subject;
- a device which carries out white balance correction with the white balance correction value changed so as to gradually converge from a current white valance correction value to the obtained white balance correction value in capturing the moving image; and
- a storing device which stores a white balance correction value used at finish of capturing the moving image,
- wherein when the continuous recording mode is set by the recording mode setting device, the white balance correction value stored in the storing device is used as a white balance correction value at start of capturing the moving image.

* * * * *